Figure 1:
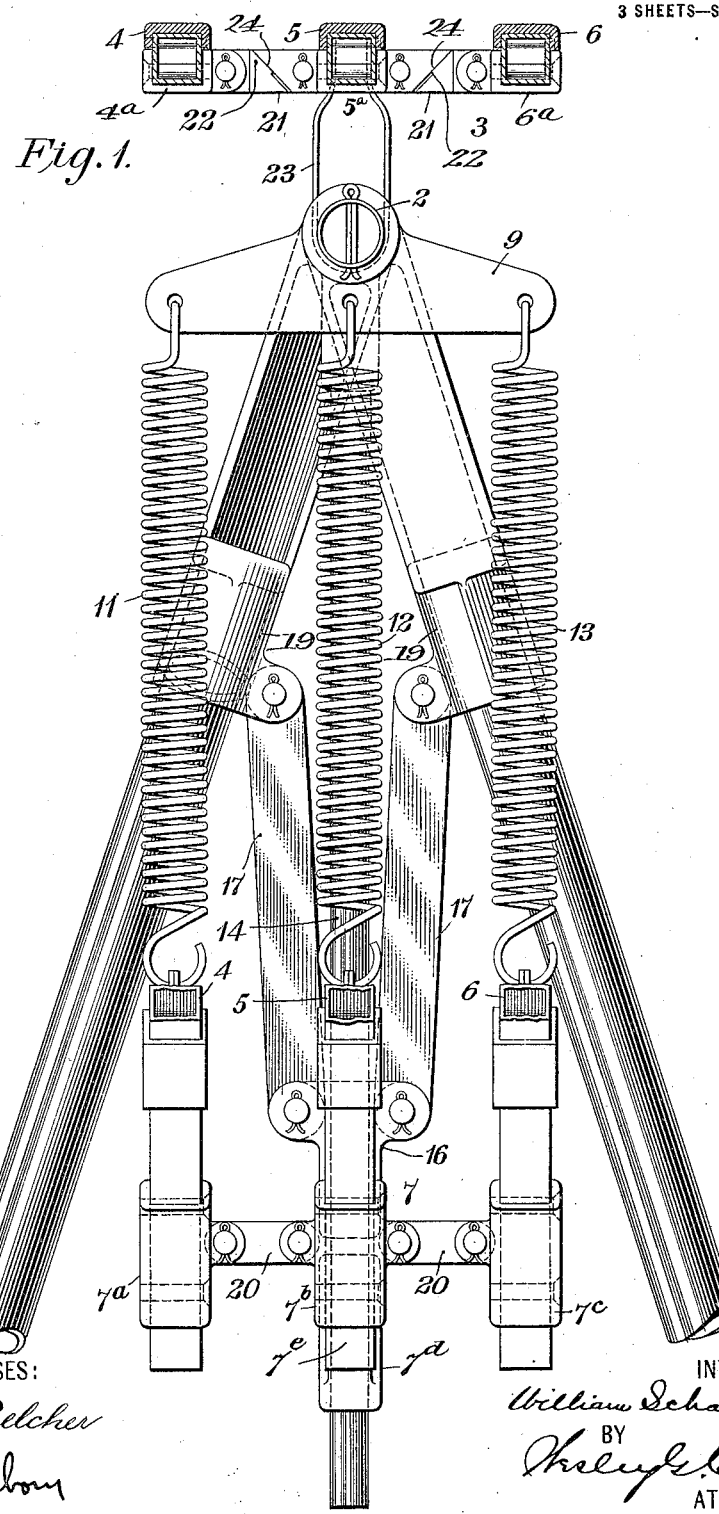

W. SCHAAKE.
TROLLEY.
APPLICATION FILED DEC. 24, 1909.

1,138,693.

Patented May 11, 1915.
3 SHEETS—SHEET 1.

WITNESSES:
C. L. Belcher
R. J. Barbour

INVENTOR
William Schaake
BY
Shelby S. Carr
ATTORNEY

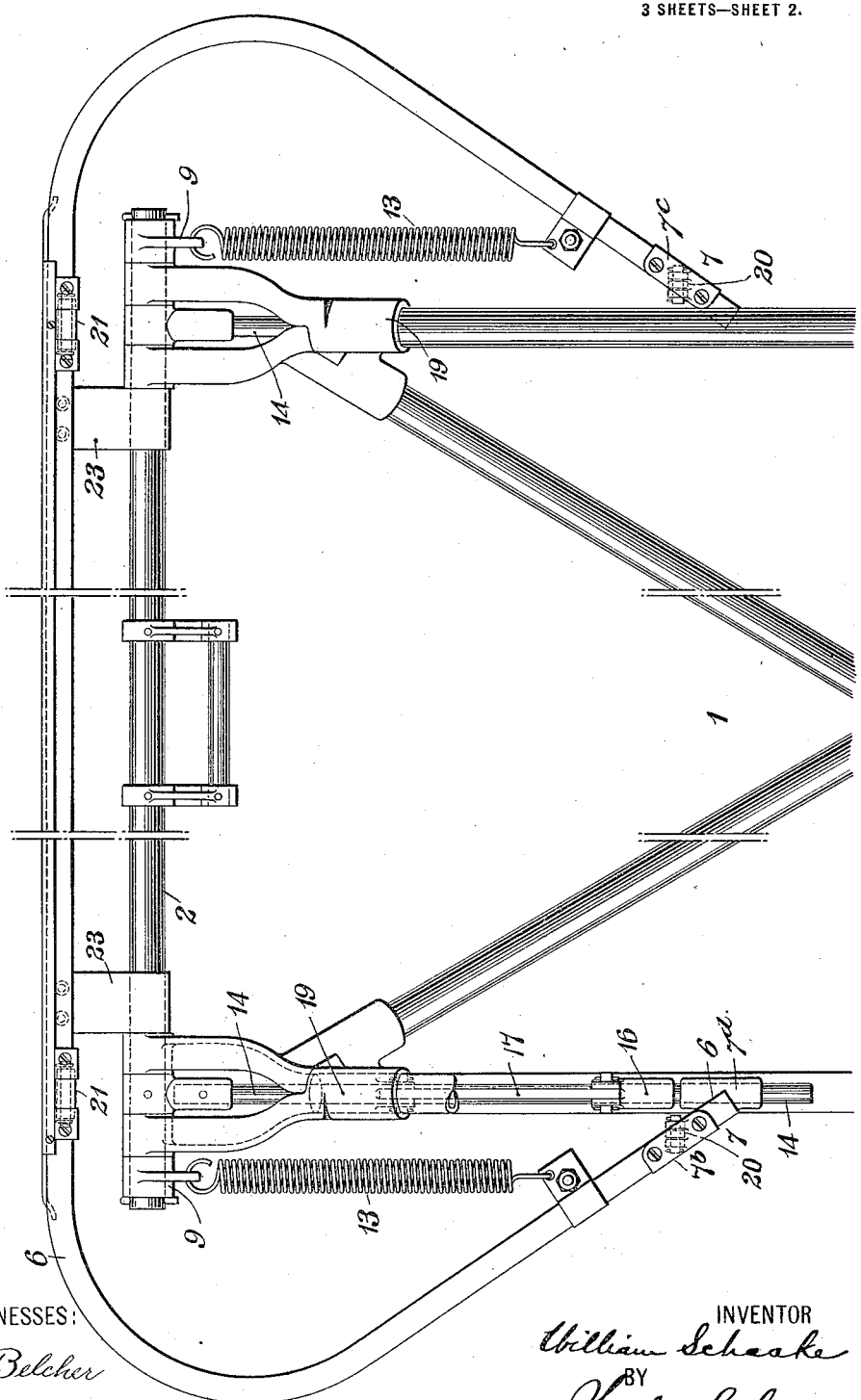

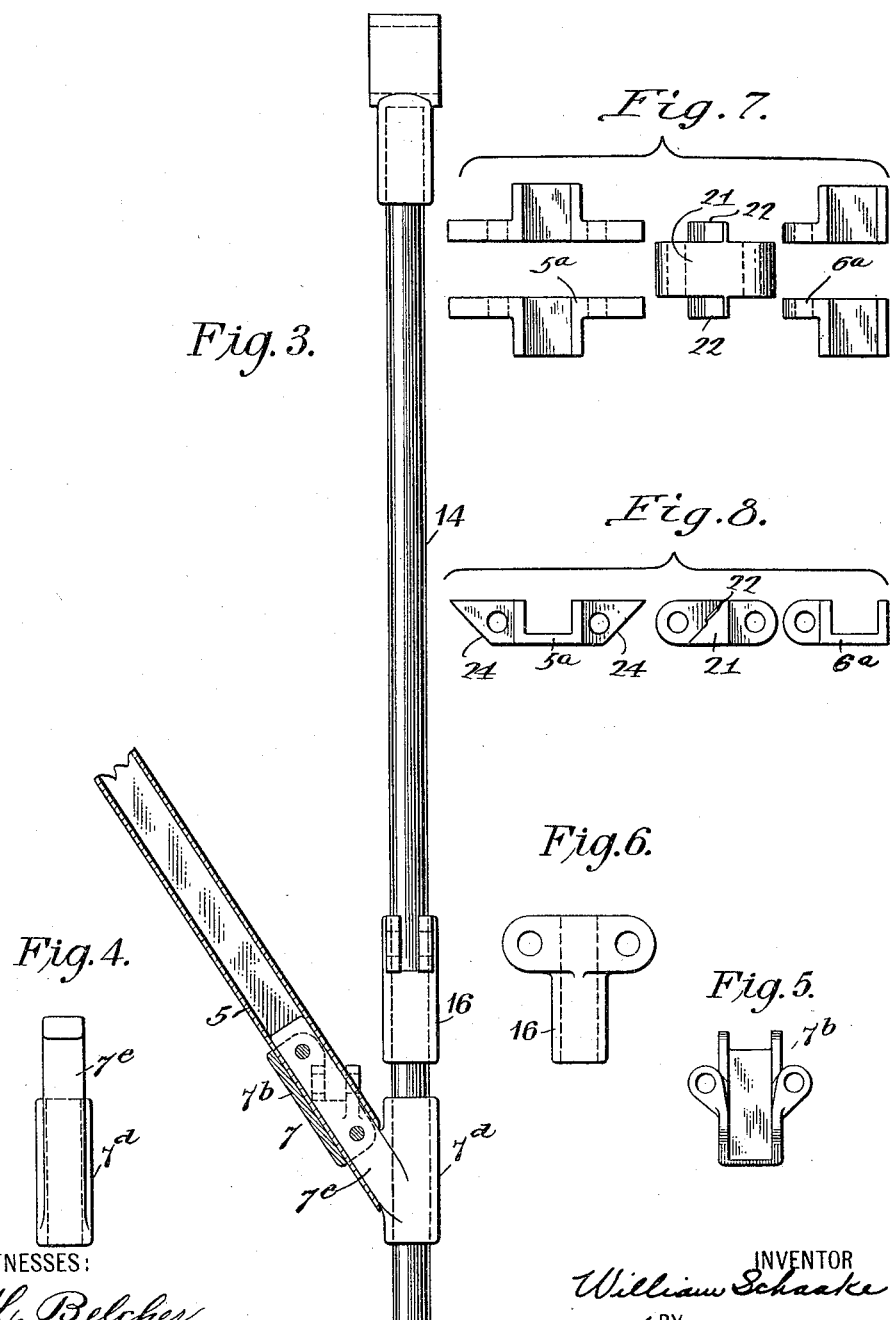

UNITED STATES PATENT OFFICE.

WILLIAM SCHAAKE, OF PITTSBURGH, PENNSYLVANIA, ASSIGNOR TO WESTINGHOUSE ELECTRIC AND MANUFACTURING COMPANY, A CORPORATION OF PENNSYLVANIA.

TROLLEY.

1,138,693.  Specification of Letters Patent.  Patented May 11, 1915.

Application filed December 24, 1909.  Serial No. 534,762.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolleys, of which the following is a specification.

My invention relates to contact devices for railway vehicles and particularly to such devices as are provided with sliding contact shoes mounted on pantograph or lazy-tongs supporting structures.

The object of my invention is to provide a simple and durable yielding connection between a multi-contact trolley shoe and the frame on which it is mounted, whereby an excellent contact may be maintained between the traveling contact member and the conductor with which it engages, under all operating conditions. When the propelling motors of electric locomotives and other vehicles are supplied with energy from an overhead conductor the contact devices on the vehicle are liable to vibrate and the overhead line structure is liable to be injured if there are any irregularities in the overhead conductor, particularly if the contact device is strongly pressed into engagement therewith. Since it is difficult to entirely avoid slight irregularities in the trolley conductor, and since it is desirable to maintain a relatively heavy pressure between the contact shoe and such conductor, if the vehicle is operated at high speeds, it is particularly desirable to provide adequate means for mounting the contact shoe on its supporting frame, which means shall be capable of transmitting large forces, and which, at the same time, shall be relatively sensitive, in order that the trolley shoe may follow the variations in the trolley conductor.

Figure 1 of the accompanying drawings is a partially sectional elevation of the upper portion of a trolley embodying my invention. Fig. 2 is a view at right angles to that of Fig. 1, and Figs. 3, 4, 5 and 6 are detail views of certain parts shown in Figs. 1 and 2. Fig. 7 is a plan view of certain coöperating parts of the trolley shoe, separated from each other, and Fig. 8 is a side elevation of the parts shown in Fig. 7.

Referring to the drawings, the structure comprises a suitable pantograph supporting frame 1 here shown as composed mainly of tubular bars or rods and a horizontal transversely disposed shaft 2, a multi-contact shoe 3, and means for yieldingly mounting the shoe on the frame and restraining it against tilting.

The shoe 3 comprises three contact members 4, 5 and 6, the member 5 being mounted directly above the shaft 2 and the members 4 and 6 being located adjacent to the respective sides of the member 5. The members 4, 5 and 6 are connected together by means of channel pieces 4ª, 5ª and 6ª, which are fastened to the respective members, and links 21 the ends of which are pivotally attached to laterally projecting arms of the channel pieces 4ª, 5ª and 6ª (see Figs. 1, 7 and 8). The ends of the three contact members are bent inwardly and downwardly in the form of a bow and are secured to movable side linkages 7 which will be hereinafter more fully described.

Brackets 9 are pivotally supported upon the respective ends of the shaft 2, and each of them is connected, by means of springs 11, 12 and 13, to the respective contact members 4, 5 and 6 near their points of connection to the linkages 7, whereby the contact members are independently resiliently supported.

A rod 14 depends from each end of the shaft 2 and a guiding sleeve 16 coöperates with each of the rods. Each of the sleeves 16 is connected by links 17 to members 19 of the frame 1 and serves as a sliding guide for the corresponding centrally disposed rod 14 whereby said rod is maintained in its same relative position at all times, irrespective of the position of the pantograph frame.

The movable side linkages 7 have sliding engagements with the correspondingly located rods 14 and function to restrain the lower ends of the several contact members 4, 5 and 6 against lateral movement, thereby preventing the multi-contact shoe 3 or any of its members 4, 5 and 6 from tilting. The linkages 7, while permitted to move up and down upon the rods 14 independently of the position of the pantograph frame, as well as the irregularities of the trolley conductor, are always constrained to substantially vertical movements by the rods 14.

Each of the restraining linkages 7 embodies a plurality of channel parts 7ª, 7ᵇ and 7ᶜ, a sleeve member 7ᵈ and a plurality of links 20. The channel parts 7ª, 7ᵇ and 7ᶜ partially inclose the lower ends of the contact members 4, 5 and 6, respectively, and are suitably fastened thereto, and the sleeve 7ᵈ is adapted to slide upon the rod 14 and is provided with an integral inclined arm 7ᵉ which projects into the end of the contact member 5 and is fitted tightly therein. The several parts 7ª, 7ᵇ and 7ᶜ are interconnected by means of links 20. Thus, the lower ends of the outer contact members 4 and 6 are tied to the sleeve member 7ᵈ, whereby lateral movement thereof is prevented, while all three of the contact members 4, 5 and 6 are permitted to rise and fall independently.

Referring again to the contact shoe 3, the several contact members 4, 5 and 6 thereof are tied together by a semi-rigid connection of peculiar form which is interposed between them, as shown in Figs. 1, 7 and 8 of the drawings. The links 21 are provided with beveled or inclined offset portions 22 which coöperate with the correspondingly inclined arms 24 of the channel member 5ª, whereby only slight relative vertical movement between the members 4, 5 and 6 is permitted. Said members are virtually tied together as a unitary structure that is held in its general operating position and is also limited in its upward movement by guides 23 which preferably constitute U-shaped straps which inclose the shaft 2, having their lower looped ends adapted to coöperate therewith and their upper free ends secured rigidly to the central contact member 5.

The arrangement of parts is such that the springs 11, 12 and 13 tend to independently force the contact members 4, 5 and 6 upwardly into engagement with the trolley conductor (not shown) or until restricted by the strap guides 23 and the semi-rigid connections between said members.

The contact shoe, as a whole, therefore, is sensitive to variations in the trolley conductor and is enabled to maintain good electrical contact therewith under high speeds. The sensitiveness of the structure is still further increased by reason of the provision for independent movement of the several light contact members which permits them to rise and fall quickly to accommodate themselves to the irregularities of the trolley conductor and to maintain good electrical engagement therewith under all conditions. Moreover, by reason of the independent mounting and resilient support of the several contact members, a disablement of one member has no effect upon a normal operation of the remaining ones.

Obviously, many modifications may be effected in the arrangement and location of parts and in the structural details thereof without departing from the spirit and scope of my invention.

I claim as my invention:

1. A trolley comprising a frame having a horizontal shaft at the top, a guide rod depending from each end thereof, a plurality of contact members movably connected to the guide rods and yieldingly supported from the ends of the shaft.

2. A trolley comprising a frame having a horizontal shaft at the top, a guide rod depending from each end thereof, brackets secured to the shaft adjacent to the guide rods and a purality of bow contact members movably connected to the guide rods at their ends, and springs connecting the ends of the contact members to the brackets for forcing the contact members upwardly.

3. A trolley comprising a frame having a horizontal shaft at the top, a guide rod depending from each end thereof, brackets secured to the shaft adjacent to the guide rods, a plurality of bow contact members, positioning sleeves movably associated with the guide rods and connected to the ends of one of the contact members, link connections between the sleeves and the ends of the other contact members, and springs connecting the brackets at the ends of the horizontal shaft to the ends of the bow contact members.

4. The combination with a plurality of hinge-connected bow contact members the contact surfaces of which are normally in substantially the same horizontal plane, of a pantograph frame having a pair of guide rods provided with positioning sleeves having link connections to frame members, elevating springs between the ends of each contact member and the frame, and a movable sleeve connection between the contact member ends and the guide rods.

5. The combination with a pantograph frame having a horizontal shaft at its upper end and a vertical guide rod depending from each end thereof, of a plurality of hinge-connected side-by-side bow contact members, lifting springs between the ends of said contact members and said shaft, movable connections between the ends of the contact members and the guide rods and positioning sleeves coöperating with said guide rods and connected to the frame to move as the frame is raised and lowered.

6. In a trolley, the combination with a pantograph frame, and a contact member resiliently associated therewith, of positive means coöperating with said contact member and said pantograph frame for permitting vertical movements of said member and preventing lateral movements thereof.

7. In a trolley, the combination with a pantograph frame and means coöperating therewith and always maintained in the same position with respect thereto, of a contact member resiliently carried by said frame and positioned by said means.

8. In a trolley, the combination with a pantograph frame and a contact member resiliently carried thereby and adapted for limited vertical movements, of means coöperating with said pantograph frame and said contact member for positively preventing tilting of said contact member.

9. In a trolley, the combination with a pantograph frame, and guiding means associated therewith and constrained to a vertical position at all times, of a resiliently supported vertically movable contact member carried by said frame and coöperating with said guiding means.

10. In a trolley, the combination with a pantograph frame, and a plurality of side-by-side independently mounted contact members carried thereby and resiliently supported thereon, of means coöperating with said pantograph frame and all of said contact members for limiting said members to vertical movements.

11. In a trolley, the combination with a pantograph frame, and a plurality of interconnected resiliently supported contact members independently mounted upon said frame and adapted for limited individual movements, of means coöperating with all of said contact members for restricting said members to vertical movements.

12. In a trolley, the combination with a pantograph frame, and a plurality of independently resiliently mounted contact members disposed in side-by-side relation, of linkages for interconnecting said members and permitting independent movement thereof and means coöperating with certain of said linkages for preventing lateral or tilting movements of said contact members.

In testimony whereof, I have hereunto subscribed my name this 10th day of Dec., 1909.

WILLIAM SCHAAKE.

Witnesses:
G. W. Borst,
B. B. Hines.

Copies of this patent may be obtained for five cents each, by addressing the "Commissioner of Patents, Washington, D. C."